(12) United States Patent
Kao et al.

(10) Patent No.: US 7,755,732 B2
(45) Date of Patent: Jul. 13, 2010

(54) LIQUID CRYSTAL DISPLAY PANEL AND METHOD FOR MANUFACTURING THE SAME

(75) Inventors: Chen Kuan Kao, Tainan (TW); Yu Ting Tsai, Tainan (TW)

(73) Assignee: Chimei Innolux Corporation (TW)

( * ) Notice: Subject to any disclaimer, the term of this patent is extended or adjusted under 35 U.S.C. 154(b) by 606 days.

(21) Appl. No.: 11/504,424

(22) Filed: Aug. 15, 2006

(65) Prior Publication Data

US 2007/0042134 A1 Feb. 22, 2007

(30) Foreign Application Priority Data

Aug. 16, 2005 (TW) .............................. 94127843 A

(51) Int. Cl.
*G02F 1/1337* (2006.01)

(52) U.S. Cl. .................. 349/123; 349/124; 349/125; 349/126; 349/129; 349/130; 349/135; 349/191

(58) Field of Classification Search ........... 349/15–157, 349/186, 191
See application file for complete search history.

(56) References Cited

U.S. PATENT DOCUMENTS

| | | | |
|---|---|---|---|
| 5,594,569 A * | 1/1997 | Konuma et al. ............. 349/122 |
| 6,043,860 A | 3/2000 | Wei et al. .................... 349/187 |
| 6,362,863 B1 * | 3/2002 | Kataoka et al. ............. 349/123 |
| 6,970,211 B2 * | 11/2005 | Sikharulidze ................ 349/93 |
| 7,471,362 B1 * | 12/2008 | Jones .......................... 349/129 |
| 2002/0018863 A1 * | 2/2002 | Ichihashi ..................... 428/1.1 |
| 2002/0126245 A1 * | 9/2002 | Towler et al. ............... 349/123 |
| 2005/0259216 A1 * | 11/2005 | Lin et al. ..................... 349/196 |

* cited by examiner

*Primary Examiner*—Hemang Sanghavi
(74) *Attorney, Agent, or Firm*—Trop, Pruner & Hu, P.C.

(57) ABSTRACT

A liquid crystal stabilizing layer may be disposed on a substrate, an opposite substrate, or both of a liquid crystal display panel. Additionally, a liquid crystal layer may be sealed between the opposing substrates. The liquid crystal stabilizing layer may have a number of protrusions. The height of the protrusions ranges from 10 to 200 nanometers and the width of the protrusions ranges from 150 to 600 nanometers.

40 Claims, 8 Drawing Sheets

| Composition of protrusion | Profile of protrusion |
|---|---|
| R'-B-R-B'-R'-Y with Z on first B and Z' on second B | cone with height h and width W |
| X-R'-B-R-B'-R'-Y with Z on first B and Z' on second B | cone with height h' and width W' |

FIG. 6A

| Composition of protrusion | Profile of protrusion |
|---|---|
| $R'=R''=-(CH_2)_6-$ | cone with height h and width W |
| $R'=R''=-(CH_2)_3-$ | cone with height h' and width W' |

FIG. 6B

| Projection intensity | Profile of protrusion |
|---|---|
| Strong | cone with height h and width W |
| weak | cone with height h' and width W' |

FIG. 6C

LIQUID CRYSTAL DISPLAY PANEL AND METHOD FOR MANUFACTURING THE SAME

CROSS-REFERENCE TO RELATED APPLICATIONS

This application claims priority under 35 U.S.C. §119 of Taiwan application Serial No. 094127843, filed Aug. 16, 2005.

TECHNICAL FIELD

The invention relates in general to a display panel and a method for manufacturing the same, and more particularly to a liquid crystal display panel and a method for manufacturing the same.

BACKGROUND

Flat panel display devices have replaced cathode ray tube (CRT) display devices as the mainstream display device in the display marketplace. One type of flat panel display device is the liquid crystal (LCD) device. FIG. 1 shows a cross-sectional view of a conventional LCD panel 100, which includes a substrate 120, an opposite substrate 110, an alignment layer 130, an alignment layer 140 and a liquid crystal layer 150. The alignment layer 130 is disposed on the opposite substrate 110, while the alignment layer 140 is disposed on the substrate 120. The material of the alignment layers 130 and 140 includes polyimide. The liquid crystal layer 150 is sealed between the opposite substrate 110 and the substrate 120.

When an electrical potential is applied between the opposite substrate 110 and the substrate 120, the liquid crystal molecules of the liquid crystal layer 150 are rotated by the strength of the applied potential for enabling the LCD panel 100 to have light transmittance according to the voltage. As a result, the LCD panel 100 is able to display frames with various gray values according to the potential applied between the opposite substrate 110 and the substrate 120.

The main function of the alignment layers 130 and 140 is to provide the boundary conditions required for stabilizing the liquid crystal molecules of the liquid crystal layer 150, so that the liquid crystal molecules of the liquid crystal layer 150 are arranged along a particular direction and order. Conventional alignment layers, however, are unable to effectively stabilize the liquid crystal molecules positioned at the boundary of the liquid crystal layer 150 due to the restriction in both the structure and the material of the alignment layers 130 and 140.

When an electrical potential is applied between the substrate 120 and the opposite substrate 110, the response rate of the liquid crystal molecules of the liquid crystal layer 150 is slowed down. When the liquid crystal display panel 100 attempts to display continuous frames, a noticeable discontinuous frame effect can easily occur, which can result in user dissatisfaction. Apart from the problem of slow response rate, the liquid crystal molecules of the liquid crystal layer 150 may even be rotated erroneously when the boundary conditions are unstable, causing deterioration of the display quality of the LCD panel 100. To resolve the above-identified problems, a method for reducing the stabilization time for liquid crystal molecules is provided in the U.S. Pat. No. 6,043,860. The method stabilizes the liquid crystal molecule positioned at the boundary of the liquid crystal layer 150 and increases the response rate of the liquid crystal molecules by adding monomers into the liquid crystal layer 150.

In addition to slow response rates of liquid crystal molecules, LCD devices also face the hurdle of achieving wider viewing angles. For example, the alignment layers 130 and 140 normally have to go through several rubbing treatments before liquid crystal molecules of the liquid crystal layer 150 are able to provide multi-directional alignment effect. However, this practice, which usually produces limited multi-directional alignment effect, makes the manufacturing process more complicated, which can result in a low yield rate.

Another approach for achieving the multi-directional alignment effect for liquid crystal molecules of the LCD panel 100 is to incorporate photo-alignment material into the alignment layers 130 and 140. However, the photo-alignment material may not be stable, and exposure equipment required to provide the photo-alignment material in the manufacturing process is expensive and complicated.

Another conventional approach of providing the multi-directional alignment effect is by forming protrusions on the alignment layers 130 and 140, forming a patterned slit on the pixel electrode of the substrate 120, or forming both the protrusions and the slit. However, this practice requires an extra mask step in the manufacturing process, which leads to increased manufacturing cost and reduced yield rate.

BRIEF DESCRIPTION OF THE DRAWINGS

FIG. 6A~FIG. 6C illustrate how the profile of a protrusion is formed according to some embodiments of the present invention;

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In an embodiment of the present invention, a liquid crystal display device may have a liquid crystal display panel that includes a liquid crystal stabilizing layer. The liquid crystal stabilizing layer may have protrusions that stabilize liquid crystal molecules in a liquid crystal layer and that provide a better alignment effect.

Referring to FIGS. 2A~2E, a method for manufacturing a liquid crystal display panel is illustrated. As shown in FIG.

2A, a liquid crystal stabilizing material layer 220 is formed on a substrate 210. The liquid crystal stabilizing material layer 220 may be formed by dripping the material of the liquid crystal stabilizing material layer 220 on a transfer roller 300, and then on the substrate 210. For example, through the relative movement between the transfer roller 300 and the substrate 210 (along a direction 350), a liquid crystal stabilizing material of appropriate thickness may be formed on the substrate 210.

Figure 1:
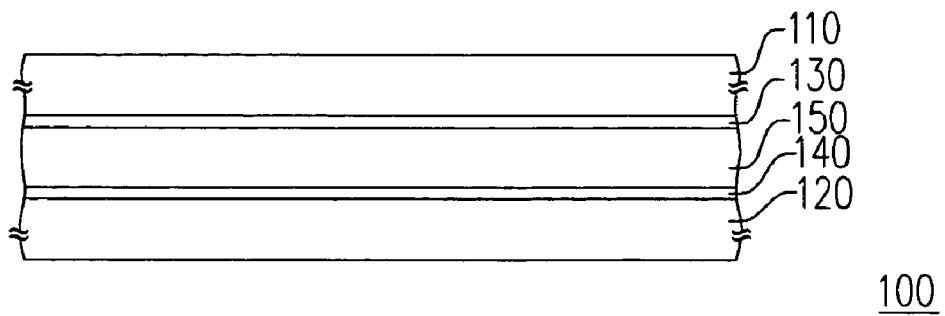
FIG. 1 (Prior Art) illustrates a cross-sectional view of a conventional liquid crystal display panel.
Figure 2A:
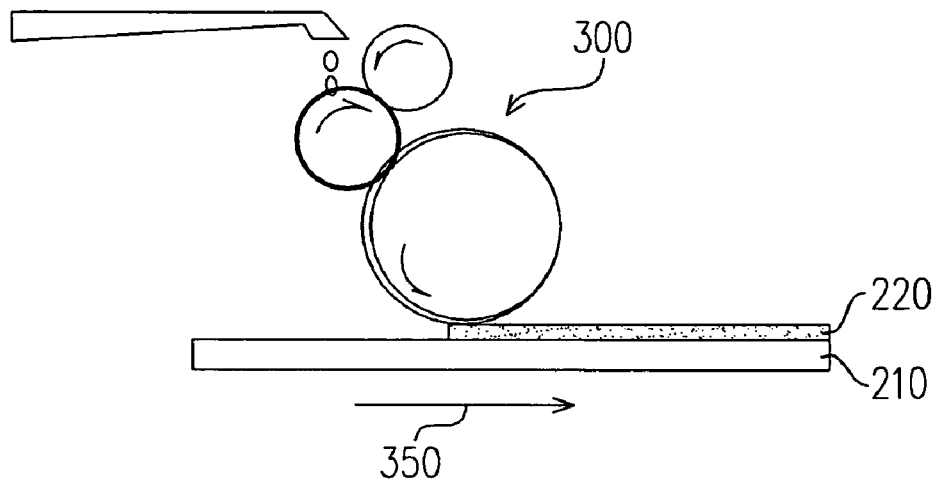
FIGS. 2A~2E illustrate a method for manufacturing a liquid crystal display panel according to some embodiments of the invention.
Figure 2B:
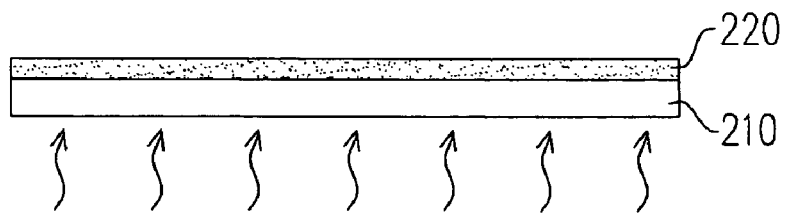
Figure 2C:
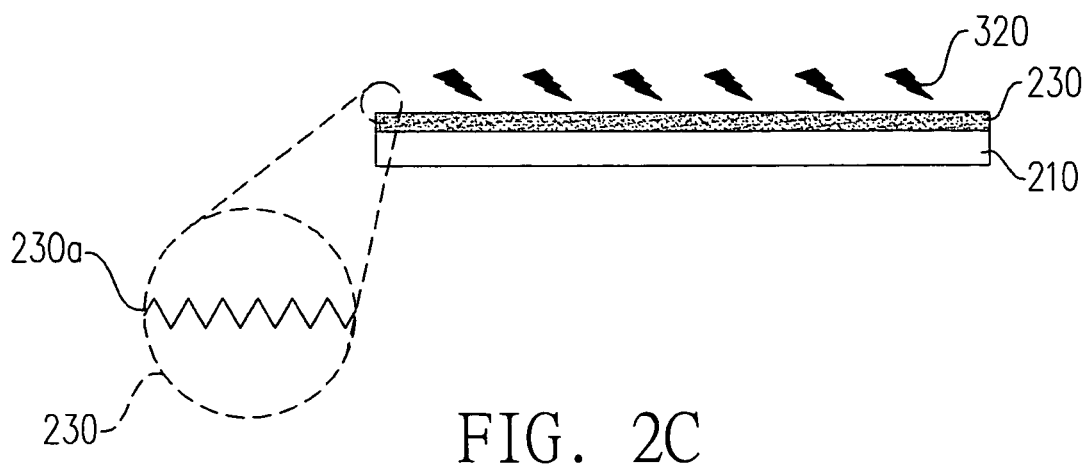
Figure 2D:
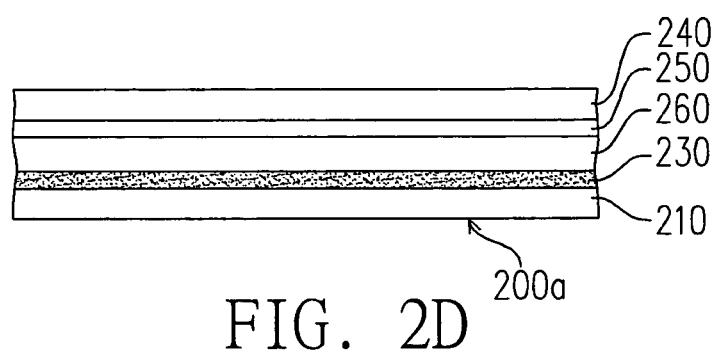
Figure 2E:
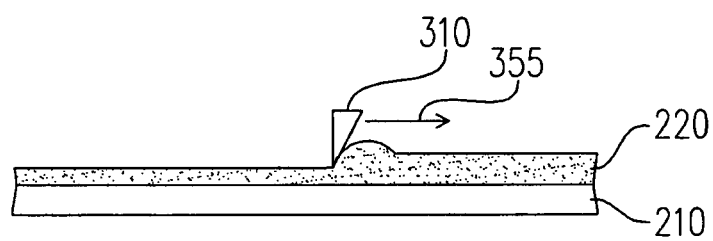

Alternatively, referring to FIG. 2E, a scraper 310 may be used to form the liquid crystal stabilizing material layer 220 on the substrate 210. For example, by moving the scraper 310 relative to the substrate 210 (along a direction 355) a liquid crystal stabilization material 220 having an appropriate thickness may be formed on the substrate 210.

After the liquid crystal stabilizing material layer 220 is formed on the substrate 210, it may be dried out, which is illustrated in FIG. 2B. In an embodiment, the substrate 210 having the liquid crystal stabilizing material layer 220 formed thereon is baked at a temperature ranging from 50° C. to 200° C. to dry the stabilizing material 220.

As shown in FIG. 2C, the liquid crystal stabilizing material layer 220 becomes a liquid crystal stabilizing layer 230 by projecting light on the liquid crystal stabilizing material 220. In some embodiments, the wavelength of the projected light 320 is 254~365 nanometers (nm), which is in the ultraviolet spectrum. Furthermore, in an embodiment, the liquid crystal stabilizing material layer 220 is composed of the material having the general formula (1):

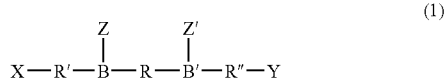
(1)

where B and B' represent an aromatic hydrocarbon such as benzene, biphenyl, or naphthyl, or a saturated ring structure such as cyclopentane or any other saturated ring structure, as a few examples. Furthermore, in the general formula (1), X and Y represent terminal groups or reactive groups such as acrylic, epoxy, urethane, or other kinds of reactive groups, and R, R', and R" represent linkages such as alkyl structures that may range from one to eight carbons, and Z and Z' represent side substituents such as hydrogen or an alkyl group such as a methyl group as one example.

More specifically, in some embodiments the material of the liquid crystal stabilizing material layer 220 may have the formula:

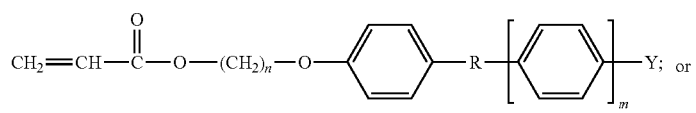

where n is an integer greater than or equal to two and less than or equal to eight, m is an integer less than or equal to three, R is an alkyl group as described above, Y is a reactive group selected from one of a n acrylic group, epoxy, or urethane, and Z is a side substituent selected from one of hydrogen or an alkyl group such as a methyl group.

Figure 3:
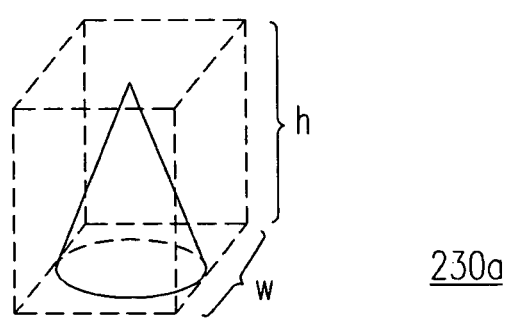
FIG. 3 illustrates an enlarged diagram of a protrusion according to some embodiments.

As shown in the close-up of 230 (FIG. 2C), after the liquid stabilizing material layer 220 has become the liquid crystal stabilizing layer 230, a number of nanometer level protrusions 230a are formed on the liquid crystal stabilizing layer 230. As shown in FIG. 3, the protrusion 230a may be cone-shaped in some embodiments. But embodiments are not limited to cone-shaped protrusions 230a; protrusions can be formed with various profiles, which may be in accordance with the material of the liquid crystal stabilizing material layer 220. The cone-shaped protrusions 230a may have a height h ranging from 10 to 200 nanometers, and a width w ranging from 150 to 600 nanometers.

In an embodiment, after the liquid crystal stabilizing layer 230 is exposed to light, an opposite substrate 240 may be provided, which is shown in FIG. 2D. An alignment layer 250 may be formed on the opposite substrate 240. In an embodiment, the alignment layer 250 is a layer of polyimide. A liquid crystal layer 260 may then be sealed between the substrate 210 and the opposite substrate 240 to form a liquid crystal display panel 200a. The material of the liquid crystal layer 260 includes nematic liquid crystal, cholesteric liquid crystal or other liquid crystal.

In some embodiments, as shown in FIG. 2C, the liquid crystal stabilizing layer 230 is formed before the substrate 210 and the opposite substrate 240 are assembled. In other embodiments, the liquid crystal stabilizing layer 230 is formed after the substrate 210 and the opposite substrate 240 are assembled.

Figure 4:
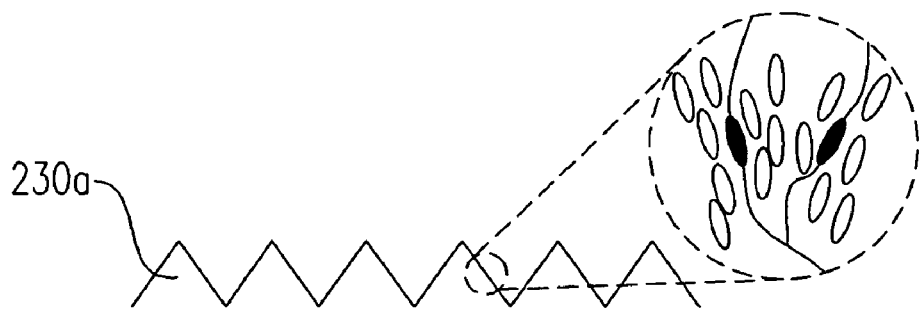
FIG. 4 illustrates an enlarged diagram of a boundary between the protrusions and the liquid crystal layer of FIG. 2D.

Referring to FIG. 4, an enlarged view of the protrusions 230a and the liquid crystal layer 260 of FIG. 2D is illustrated. As stated, the geometry size of the protrusion 230a is at nanometer level. Furthermore, the molecule structure of the surface of the protrusion 230a positioned at the boundary between the protrusion 230a and the liquid crystal layer 260 forms a stable structure with adjacent liquid crystal molecules. As shown in the close-up view, the filled-in ovals represent the core (e.g., B and B' of general formula (1)) of the molecules of the liquid crystal stabilizing layer whereas the unfilled ovals represent the core of the molecules of the liquid

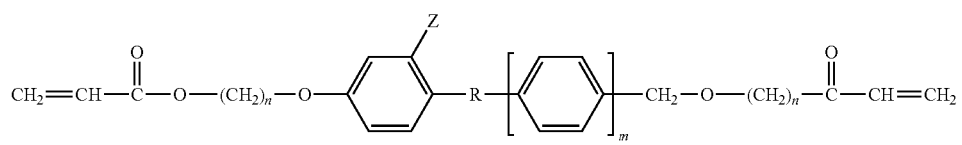

crystal material as previously described. Therefore, the protrusions 230a stabilize the liquid crystal molecules and their direction of rotation.

Figure 5A:
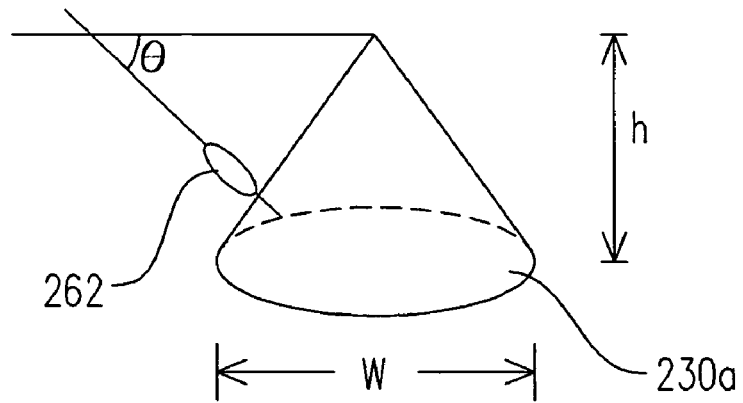
FIGS. 5A~5B illustrate how the pre-tilt angle of a liquid crystal molecule is affected by the profile of a protrusion.
Figure 5B:
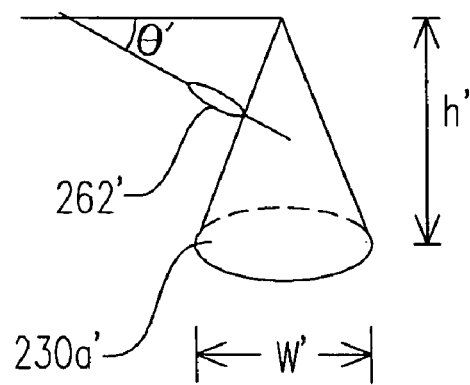

The protrusions 230a disposed on the liquid crystal stabilizing layer 230 may also provide a pre-tilt angle to the liquid crystal molecules to widen the viewing angle. For example, referring to FIGS. 5A~5B, the pre-tilt angle of the liquid crystal molecule 262 may be defined as the angle contained between the principal axis of the liquid crystal molecule and the horizontal direction. The pre-tilt angle θ of the liquid crystal molecule 262 illustrated in FIG. 5A is larger than the pre-tilt angle θ' of the liquid crystal molecule 262' illustrated in FIG. 5B. This is because the h/w ratio of the protrusion 230a shown in FIG. 5A is smaller than the h'/w' ratio of the protrusion 230a' shown in FIG. 5B. Thus, adjusting the profile of the protrusion 230a such as adjusting the h/w ratio enables the liquid crystal to be stabilized and aligned.

The profile of the protrusion 230a may be adjusted by changing one or more of the chemical makeup of the protrusion, by changing the intensity of the light projected on the liquid crystal stabilizing material layer 220, or by changing the temperature or other parameters of the manufacturing process, as a few examples. Embodiments of the present invention, however, are not limited to these few examples.

For example, referring to FIGS. 6A~6B, the profile of a protrusion may be adjusted by changing the chemical composition of the protrusion. Referring to FIG. 6A, the presence or removal of a reactive group X from the liquid crystal stabilizing material having the general formula (1) adjusts the profile of the protrusion 230a. As shown in the upper row of FIG. 6A, if the reactive group X is not present, the h/w ratio of the protrusion 230a is smaller than the h'/w' ratio of the protrusion 230a having the reactive group X, which is shown in the lower row of FIG. 6A.

Additionally, still referring to FIG. 6A, the profile of the protrusion 230a may be adjusted by changing the constituent of the liquid crystal stabilizing material. For example, when the reactive group X or Y of the liquid crystal stabilizing material of formula (1) is acrylic the profile of the protrusion will differ from the profile of a protrusion 230a formed when the reactive group X or Y of formula (1) is epoxy.

Referring to FIG. 6B, the profile of the protrusion 230a may also be adjusted by adjusting the length of the linkage R' or R" between ring systems of the liquid crystal stabilizing material whose chemical structure is expressed as formula (1). For example, when the linkages R' and R" of the liquid crystal stabilizing material of formula (1) is —$(CH_2)_6$—, the h/w ratio of the protrusion 230a formed thereby will be smaller than the h'/w' ratio of the protrusion 230a when the linkages R' and R" correspond to —$(CH_2)_3$— whose linkage length is shorter.

In some embodiments, the profile of the protrusion 230a formed on the liquid crystal stabilizing layer 230 may depend on the intensity of light projected on the material 220. For example, as shown in the top row of FIG. 6C, when the projection of the light 320 is strong (e.g., 1i~6i, where i is the projection intensity of the light), the h/w ratio of the protrusion 230a is smaller than the h/w ratio of the protrusion 230a formed when the projection of the light 320 is weak (e.g., 0.3i), which is shown in the lower row of FIG. 6C.

Figure 7A:
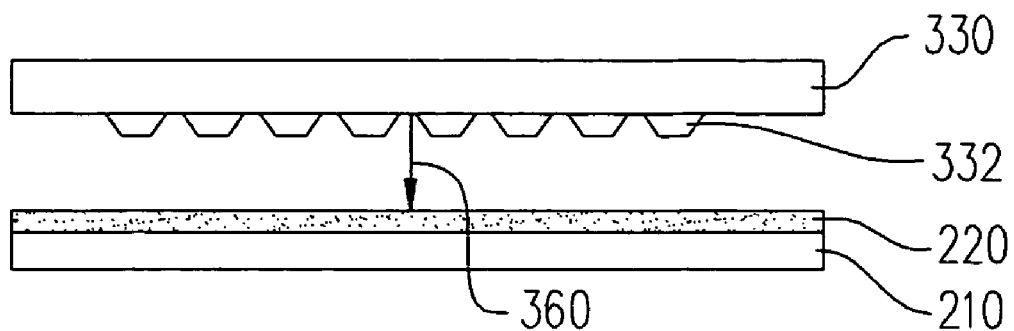
FIG. 7A~FIG. 7C illustrate a process of forming a protruded pattern on a liquid crystal stabilizing layer according to some embodiments.
Figure 7B:
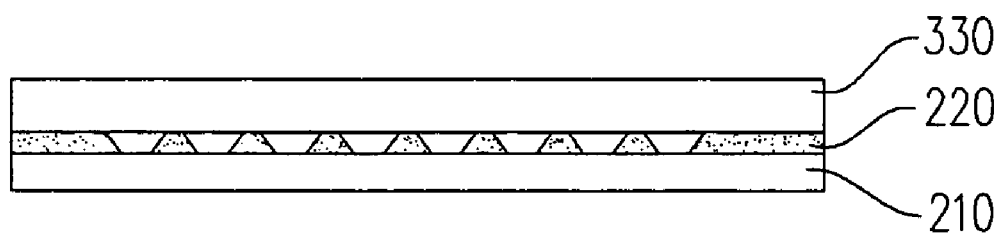
Figure 7C:
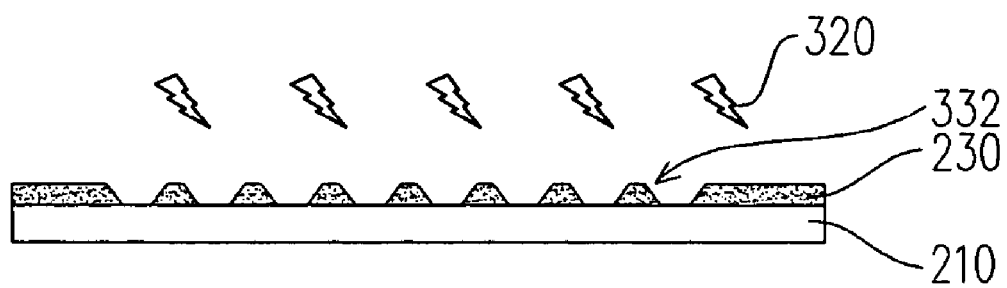

In addition to adjusting the profile of the protrusion 230a, a protruded pattern can be formed on the liquid crystal stabilizing layer 230. The protruded pattern may enhance the alignment effect of the liquid crystal stabilizing layer 230. Referring back to FIGS. 2B and 2C and referring to FIG. 7A, after the liquid crystal stabilizing material layer 220 is formed on the substrate 210 and before the liquid crystal stabilizing material layer 220 is projected by the light 320, a press mold 330 (FIG. 7A) may be moved along the direction 360. The surface of the press mold 330 has a protruded pattern 332. As shown in FIG. 7B, the protruded pattern 332 may be transferred from the press mold 330 to the liquid crystal stabilizing material layer 220 by applying a predetermined pressure to press the press mold 330, which is disposed on the liquid crystal stabilizing material layer 220. After the press mold 330 is removed from the liquid crystal stabilizing material layer 220, the light 320 is projected to obtain the liquid crystal stabilizing layer 230 equipped with the protruded pattern 332. In those embodiments having the liquid crystal stabilizing layer 230 equipped with the protruded pattern 332, a better liquid crystal alignment effect and an improved viewing angle of the liquid crystal display panel 200 may be observed.

Embodiments of a liquid crystal display panel are not limited to the panel 200a depicted in FIG. 2D. Namely, a display panel 200 is not limited to a liquid crystal stabilizing layer 230 on a substrate 210 and an alignment layer 250 on an opposite substrate 240 with a liquid crystal layer 260 disposed there between. Embodiments of a liquid crystal display panel may encompass various combinations of components, a few of which are illustrated in FIGS. 8A~8C.

Figure 8A:
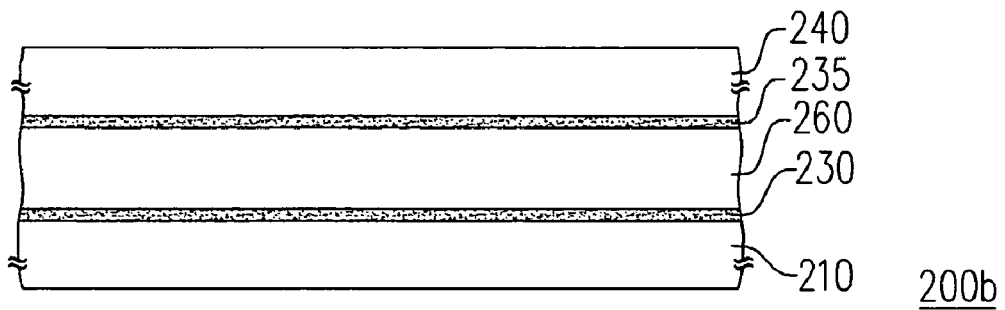
FIG. 8A~FIG. 8C illustrate various types of liquid crystal display panels according to some embodiments.

For example, the liquid crystal display panel 200b shown in FIG. 8A includes another liquid crystal stabilizing layer 235, which is formed on the opposite substrate 240. In some embodiments, the other liquid crystal stabilizing layer 235 may replace the alignment layer 250 shown in FIG. 2D although embodiments are not so limited. Thus, in an embodiment, a liquid crystal display panel such as panel 200b may include a liquid crystal stabilizing layer 230 disposed on the substrate 210, and a liquid crystal stabilizing layer 235 disposed on the opposite substrate 240.

Figure 8B:
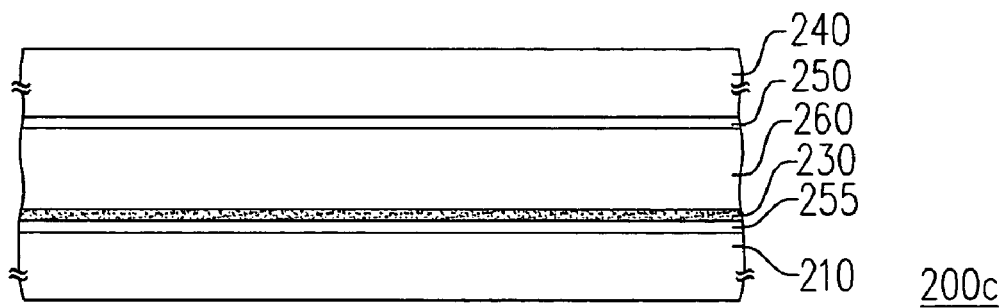

Another non-limiting example of a liquid crystal display panel 200c is shown in FIG. 8B. In this example, the alignment layer 255 and the liquid crystal stabilizing layer 230 are both disposed on the substrate 210. The alignment layer 255 is disposed on the substrate 210 before the liquid crystal stabilizing layer 230 is formed. Liquid crystal display panel 200c may also include an opposite substrate 240 with another alignment layer 250 disposed thereon and a liquid crystal layer 260 between the other alignment layer 250 and the stabilizing layer 230.

Figure 8C:
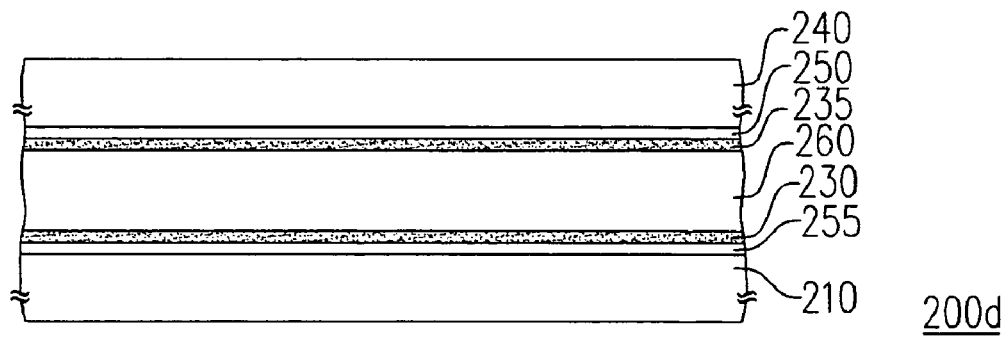

In yet another example, a liquid crystal display panel, such as liquid crystal display panel 200d, which is shown in FIG. 8C, may include two alignment layers 255 and 250 that are formed on the substrate 210 and the opposite substrate 240 respectively. Liquid crystal display panel 200d may also have two liquid crystal stabilizing layers 230 and 235 formed on the two alignment layers 255 and 250 respectively. Thus, the alignment layer 255 and the liquid crystal stabilizing layer 230 are disposed on the substrate 210, and the alignment layer 250 and the liquid crystal stabilizing layer 235 are disposed on the opposite substrate 240. Additionally, the alignment layer 255 is disposed between the liquid crystal stabilizing layer 230 and the substrate 210, whereas the alignment layer 250 is disposed between the liquid crystal stabilizing layer 235 and the opposite substrate 240.

In embodiments that include one or more liquid crystal stabilizing layers that are not disposed on an alignment layer, such as the panels 200 shown in FIG. 2D and FIG. 8A as examples, the liquid crystal stabilizing layer 230 enables the liquid crystal molecules of the liquid crystal layer 260 to achieve a stable alignment state. For example, if a potential is applied between the substrate 210 and the opposite substrate 240 of the panels 200 depicted in FIGS. 2D and 8A, the liquid crystal molecules of the liquid crystal layer 260 may achieve a stable alignment state fast. These liquid crystal display panels (e.g., 200 and 200b), however, are unable to reduce the required time for the liquid crystal molecules to achieve a stable state through a structure including an overlapping alignment layer.

In embodiments that do include one or more liquid crystal stabilizing layers disposed on alignment layer, such as the panels depicted in FIGS. 8B and 8C, the overlapping structure of the liquid crystal stabilizing layer and the alignment layer enables the liquid crystal molecules of the liquid crystal layer 260 to achieve a stable alignment state fast. Furthermore, if a potential is applied between the substrate 210 and the opposite substrate 240 of these liquid crystal display panels (such as the panels shown in FIGS. 8B and 8C), the liquid crystal molecules of the liquid crystal layer 260 promptly achieve a stable alignment state. This is because the liquid crystal molecules are affected by both the potential and the overlapping structure of the liquid crystal stabilizing layer and the alignment layer.

In some embodiments of the invention, the liquid crystal layer may be directly doped with the liquid crystal stabilizing material to form the liquid crystal stabilizing layer at the boundary between the liquid crystal layer and the substrate and/or the opposite substrate. In some instances, the liquid crystal stabilizing layer may be formed after the panel 200 is assembled.

Figure 9A:
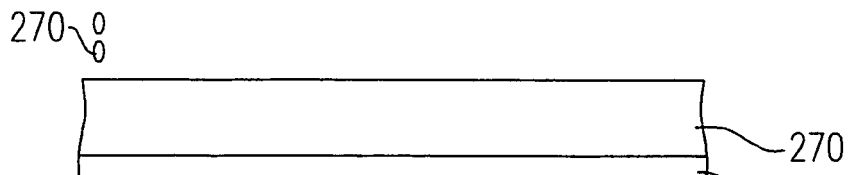
FIGS. 9A~9C illustrate another method for manufacturing a liquid crystal display panel according to other embodiments of the invention.

For example, referring to FIG. 9A, a liquid crystal compound 270 may be provided on a substrate 210. In some embodiments, the liquid crystal compound 270 includes a liquid crystal material and a liquid crystal stabilizing material. The liquid crystal stabilizing material may have the general chemical formula (1). The liquid crystal compound 270 may be formed on the substrate 210 according to the liquid crystal one drop fill (ODF) technology.

Figure 9B:
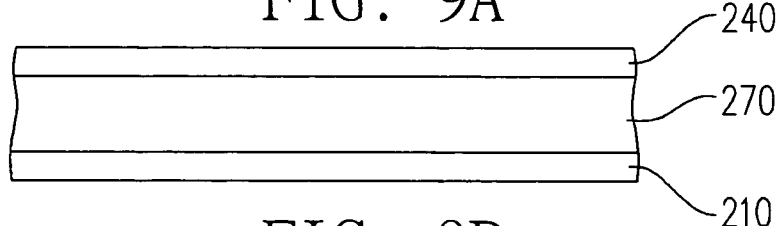

Referring to FIG. 9B, an opposite substrate is provided 240, and the liquid crystal compound 270 is sealed between the substrate 210 and the opposite substrate 240. Thereafter, a light 320 (FIG. 9C) may be projected on the liquid crystal compound 270, while it is disposed between the substrate 210 and the opposite substrate 240, to form the liquid crystal stabilizing layers 230 and 235. In this way, a liquid crystal display panel, such as panel 200e, may be formed having two liquid crystal stabilizing layers. The liquid crystal stabilizing layer 230 is formed at a first boundary between the liquid crystal compound 270 and the substrate 210 and/or the liquid crystal stabilizing layer 235 is formed at a second boundary between the liquid crystal compound 270 and the opposite substrate 240.

In the liquid crystal display panel depicted as panel 200e, the substrate 210 and the opposite substrate 240 have the liquid crystal stabilizing layers 230 and 235, respectively formed thereon. Embodiments of the present invention are not so limited; in some embodiments, alignment layers may be disposed between the substrate 210 and the liquid crystal stabilizing layer 230 and/or between the opposite substrate 240 and the liquid crystal stabilizing layer 235.

Figure 9C:
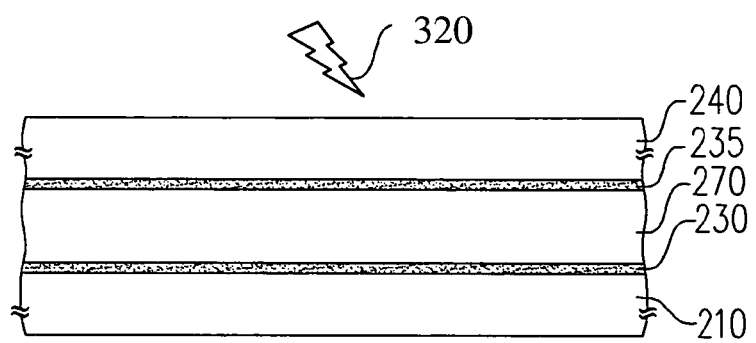
Figure 10A:
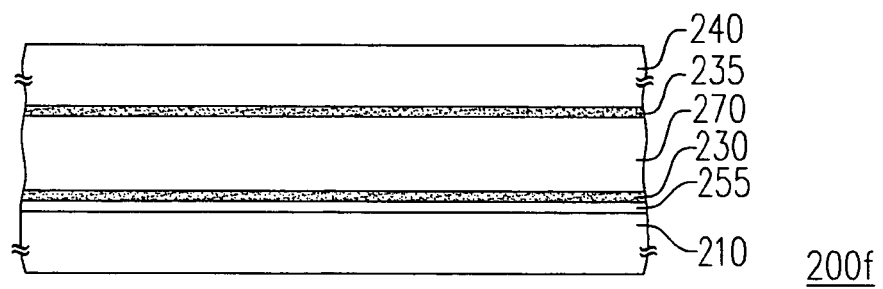
FIGS. 10A and 10B illustrate various liquid crystal display panels that may be formed according to some embodiments.

For example, as shown in FIG. 10A, an embodiment of a liquid crystal display panel such as panel 200f may have an alignment layer 255 formed on the substrate 210. In this example, the alignment layer 255 is disposed between the liquid crystal stabilizing layer 230 and the substrate 210. During manufacturing, the alignment layer 255 may be formed on the substrate 210 before the liquid crystal compound 270 is dripped on the substrate 210. Thereafter, the liquid crystal stabilizing layers 230 and 235 may be formed as described in connection with FIG. 9C. Thus, the completed liquid crystal display panel 200f has the alignment layer 255 and the liquid crystal stabilizing layer 230 disposed on substrate 210, and the liquid crystal stabilizing layer 235 disposed on the opposite substrate 240.

Figure 10B:
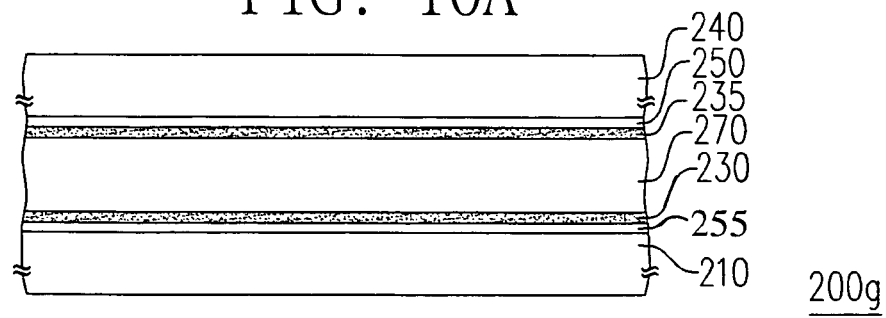

Referring to FIG. 10B, in other embodiments, two alignment layers 255 and 250 may be formed, one on the substrate 210 and the opposite substrate 240 respectively. The layers 255 and 250 may be formed on the substrate 210 and opposite the substrate 240 respectively, before the liquid crystal compound 270 is dripped on the substrate 210. As with the liquid crystal display panel 200e, light may be projected on the liquid crystal compound 270 of panel 200g to form the stabilizing layers 230 and 235 when the compound 270 is disposed between the substrate 210 and opposite substrate 240. Thus, the completed liquid crystal display panel 200g has the alignment layer 255 and the liquid crystal stabilizing layer 230 disposed on the substrate 210, and the alignment layer 250 and the liquid crystal stabilizing layer 235 disposed on the opposite substrate 240. The alignment layer 255 is also disposed between the liquid crystal stabilizing layer 230 and the substrate 210, and the alignment layer 250 is disposed between the liquid crystal stabilizing layer 235 and the opposite substrate 240.

In embodiments that include liquid crystal stabilizing layers 230 and 235 that are not disposed on an alignment layer, such as is shown in FIG. 9C, the liquid crystal molecules of the liquid crystal layer 230 may achieve a stable alignment state. Namely, if a potential is applied between the substrate 210 and the opposite substrate 240 of the panel 200e, the liquid crystal molecules of the liquid crystal layer 270 are enabled to achieve a stable alignment state fast. But the liquid crystal display panel 200e is unable to reduce the required time for the liquid crystal molecules to achieve a stable state through the overlapping structure of the liquid crystal stabilizing layer and the alignment layer.

In embodiments that have one or more overlapping structures of a liquid crystal stabilizing layer and an alignment layer, such as shown in FIGS. 10A and 10B, the liquid crystal molecules of the liquid crystal layer 270 are enabled to achieve a stable alignment state fast. If a potential is applied between the substrate 210 and the opposite substrate 240 of the panels 200f and 200g shown in FIG. 10A and FIG. 10B, the liquid crystal molecules of the liquid crystal layer 270, are affected by both the potential and the overlapping structure of the liquid crystal stabilizing layer and the alignment layer, to promptly achieve a stable alignment state.

Figure 11:
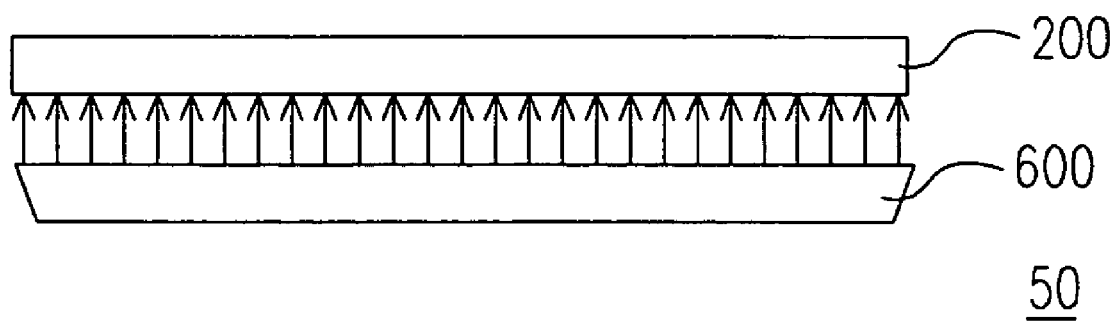
FIG. 11 illustrates an embodiment of a liquid crystal display device.

Backlight module 600 may be disposed adjacent to the substrate 210, as shown in FIG. 11, to form a liquid crystal display device 50. The backlight module 600 provides a backlight source to any of liquid crystal display panels 200 manufactured according to an embodiment of the invention.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A liquid crystal display panel, comprising:
a substrate;
an opposite substrate;
a plurality of protrusions disposed on the substrate, the plurality of protrusions formed of a liquid crystal stabilizing material; and
a nematic liquid crystal layer in direct contact with the plurality of protrusions and sealed between the substrate and the opposite substrate,
wherein the plurality of protrusions stabilize and provide pre-tilt angles to liquid crystal molecules of the nematic liquid crystal layer.

2. The liquid crystal display panel of claim 1, wherein a height of an individual protrusion is a height of 10 to 200 nanometers.

3. The liquid crystal display panel of claim 1, wherein a width of an individual protrusion is a width of 150 to 600 nanometers.

4. The liquid crystal display panel of claim 1, wherein the liquid crystal stabilizing material has a general formula (I):

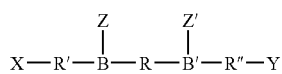

wherein B and B' represent an aromatic hydrocarbon or a saturated ring structure and where B and B' can be the same or different;
wherein X is one of epoxy or an acrylic group;
wherein Y is one of epoxy or an acrylic group;
wherein R, R', and R" represent linkages comprising alkyl structures and wherein R, R' and R" can be the same or different; and
wherein Z and Z' represent a side substituent selected from hydrogen or an alkyl group and where Z and Z' can be the same or different.

5. The liquid crystal display panel of claim 4, wherein the aromatic hydrocarbon is selected from the group consisting of benzene, biphenyl, or naphthyl.

6. The liquid crystal display panel of claim 4, wherein the linkages comprising an alkyl structure ranges from 1 to 8 carbons, and Z and Z' are either hydrogen or a methyl group, wherein Z and Z' can be the same or different.

7. The liquid crystal display panel of claim 4, wherein the liquid crystal stabilizing material has the general formula:

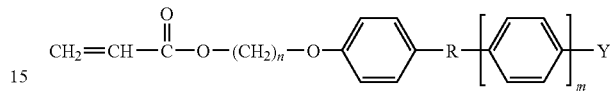

whereas n is an integer greater than or equal to two and less than or equal to eight, and m is an integer less than or equal to three.

8. The liquid crystal display panel of claim 4, wherein the liquid crystal stabilizing material has the general formula:

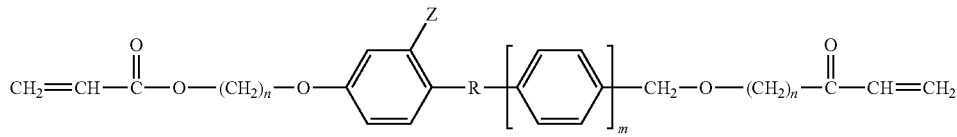

wherein n is an integer greater than or equal to two and less than or equal to eight, and m is an integer less than or equal to three.

9. The liquid crystal display panel of claim 1, further comprising an alignment layer disposed on the opposite substrate.

10. The liquid crystal display panel of claim 9, further comprising an opposite alignment layer disposed between the substrate and the plurality of protrusions.

11. The liquid crystal display panel of claim 1, further comprising an opposite liquid crystal stabilizing layer disposed on the opposite substrate.

12. The liquid crystal display panel of claim 11, further comprising an alignment layer disposed between the substrate and the plurality of protrusions, the alignment layer having a substantially planar surface, and an opposite alignment layer disposed between the opposite substrate and the opposite liquid crystal stabilizing layer.

13. The liquid crystal display panel of claim 1, wherein the protrusions are arranged in a pattern.

14. The liquid crystal display panel of claim 1, wherein the nematic liquid crystal layer is substantially vertically aligned.

15. The liquid crystal display panel of claim 1, wherein the plurality of protrusions of the liquid crystal stabilizing layer are configured to widen a viewing angle.

16. The liquid crystal display panel of claim 1, wherein the plurality of protrusions of the liquid crystal stabilizing layer are configured to align the nematic liquid crystal layer.

17. The liquid crystal display panel of claim 1, wherein at least a portion of the plurality of protrusions have different profiles.

18. The liquid crystal display panel of claim 17, wherein the liquid crystal stabilizing layer comprises different materials, and wherein the different profiles are formed in accordance with the different materials.

19. The liquid crystal display device of claim 1, wherein each of the protrusions is cone-shaped.

20. A liquid crystal display device, comprising:
a liquid crystal display panel, comprising:
  a substrate;
  an opposite substrate;
  an alignment layer disposed on the substrate, the alignment layer having a substantially planar surface
  a liquid crystal stabilizing layer disposed on the substantially planar surface of the alignment layer, the liquid crystal stabilizing layer having a plurality of protrusions to stabilize and align the liquid crystal layer; and
  a liquid crystal layer in contact with the liquid crystal stabilizing layer and sealed between the substrate and the opposite substrate; and
a backlight module disposed adjacent to the substrate.

21. The liquid crystal display device of claim 20, wherein a height of an individual protrusion ranges from 10 to 200 nanometers.

22. The liquid crystal display device according to claim 20, wherein a width of an individual protrusion ranges from 150 to 600 nanometers.

23. The liquid crystal display device of claim 20, wherein the liquid crystal stabilizing layer comprises a material having the general formula (I):

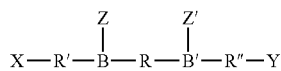

wherein B and B' represent an aromatic hydrocarbon or a saturated ring structure and wherein B and B' can be the same or different;
wherein X is one of epoxy or an acrylic group;
wherein Y is one of epoxy or an acrylic group;
wherein R, R', and R" represent linkages comprising alkyl structures, and wherein R, R', and R" can be the same or different; and
wherein Z and Z' represent a side substituent and is one of hydrogen or an alkyl group and where Z and Z' can be the same or different.

24. The liquid crystal display device of claim 23, wherein the aromatic hydrocarbon of the liquid stabilizing material is selected from the group consisting of benzene, naphthyl, and biphenyl.

25. The liquid crystal display device of claim 23, wherein the liquid crystal stabilizing material includes linkages comprising an alkyl structure ranging from 1 to 8 carbons, and Z and Z' are one of hydrogen or a methyl group, wherein Z and Z' can be the same or different.

26. The liquid crystal display device of claim 23, wherein the liquid crystal stabilizing layer comprises a material having the general formula:

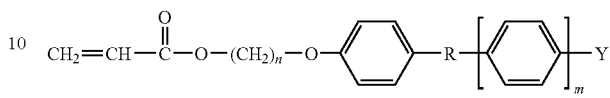

wherein n is an integer greater than or equal to two and less than or equal to eight, and m is an integer less than or equal to three.

27. The liquid crystal display device of claim 23, wherein the liquid crystal stabilizing layer comprises a material having the general formula:

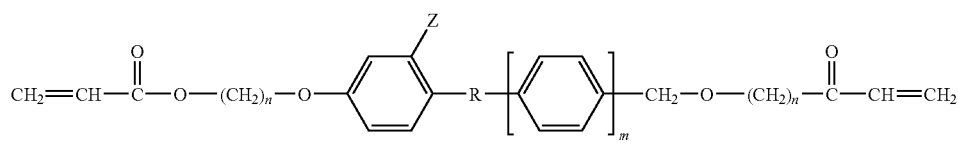

where n is an integer greater than or equal to two and less than or equal to eight, and m is an integer less than or equal to three.

28. The liquid crystal display device of claim 20, further comprising an alignment layer disposed on the opposite substrate.

29. The liquid crystal display device of claim 28, further comprising an opposite alignment layer disposed between the substrate and the liquid crystal stabilizing layer.

30. The liquid crystal display device of claim 20, further comprising an opposite liquid crystal stabilizing layer disposed on the opposite substrate.

31. The liquid crystal display device of claim 30, further comprising an alignment layer disposed between the substrate and the liquid crystal stabilizing layer, and an opposite alignment layer disposed between the opposite substrate and the opposite liquid crystal stabilizing layer.

32. The liquid crystal display device of claim 20, wherein the liquid crystal stabilizing layer has a protruded pattern.

33. The liquid crystal display device of claim 20, wherein the liquid crystal layer comprises nematic liquid crystals.

34. The liquid crystal display device of claim 20, wherein the liquid crystal layer is substantially vertically aligned.

35. The liquid crystal display device of claim 20, wherein the plurality of protrusions of the liquid crystal stabilizing layer provide pre-tilt angles to liquid crystal molecules of the liquid crystal layer.

36. The liquid crystal display device of claim 20, wherein the plurality of protrusions of the liquid crystal stabilizing layer are configured to widen a viewing angle.

37. The liquid crystal display device of claim 20, wherein at least a portion of the plurality of protrusions of the liquid crystal stabilizing layer have different profiles.

38. The liquid crystal display device of claim 37, wherein the liquid crystal stabilizing layer comprises a plurality of different materials, and wherein the different profiles are formed in accordance with the different materials.

39. The liquid crystal display device of claim 20, wherein the liquid crystal stabilizing layer has a discontinuous surface defining a plurality of individual protrusions.

40. The liquid crystal display device of claim 20, wherein the plurality of protrusions are cone-shaped.

* * * * *